United States Patent
Tan

(10) Patent No.: US 9,569,073 B2
(45) Date of Patent: Feb. 14, 2017

(54) METHOD FOR OUTPUTTING A MODIFIED AUDIO SIGNAL AND GRAPHICAL USER INTERFACES PRODUCED BY AN APPLICATION PROGRAM

(71) Applicant: RAZER (ASIA-PACIFIC) PTE. LTD., Singapore (SG)

(72) Inventor: Min-Liang Tan, Singapore (SG)

(73) Assignee: RAZER (ASIA-PACIFIC) PTE. LTD., Singapore (SG)

( * ) Notice: Subject to any disclaimer, the term of this patent is extended or adjusted under 35 U.S.C. 154(b) by 0 days.

(21) Appl. No.: 14/646,677

(22) PCT Filed: Nov. 22, 2012

(86) PCT No.: PCT/SG2012/000439
§ 371 (c)(1),
(2) Date: May 21, 2015

(87) PCT Pub. No.: WO2014/081384
PCT Pub. Date: May 30, 2014

(65) Prior Publication Data
US 2015/0293655 A1 Oct. 15, 2015

(51) Int. Cl.
*G06F 3/16* (2006.01)
*G06F 3/0484* (2013.01)
*G06F 3/0486* (2013.01)
*H04S 1/00* (2006.01)
*G06F 3/0481* (2013.01)

(52) U.S. Cl.
CPC .......... *G06F 3/0484* (2013.01); *G06F 3/0481* (2013.01); *G06F 3/0486* (2013.01); *G06F 3/04847* (2013.01); *H04S 1/005* (2013.01); *H04S 2420/01* (2013.01)

(58) Field of Classification Search
CPC combination set(s) only.
See application file for complete search history.

(56) References Cited

U.S. PATENT DOCUMENTS 5,850,455 A * 12/1998 Arnold ................. H04S 3/00
381/1
6,046,722 A * 4/2000 McKiel, Jr. ......... G06F 3/04842
345/157

(Continued)

FOREIGN PATENT DOCUMENTS

KR 10-2008-0055622 A 6/2008

OTHER PUBLICATIONS

International Search Report and Written Opinion mailed May 31, 2013 in International Application No. PCT/SG2012/000439, 7 pages.

(Continued)

*Primary Examiner* — Hien Duong
(74) *Attorney, Agent, or Firm* — Polsinelli PC

(57) ABSTRACT

According to various embodiments, a method for outputting a modified audio signal may be provided. The method may include: receiving from a user an input indicating an angle; determining a parameter for a head-related transfer function based on the received input indicating the angle; modifying an audio signal in accordance with the head-related transfer function based on the determined parameter; and outputting the modified audio signal.

16 Claims, 12 Drawing Sheets

(56) References Cited

U.S. PATENT DOCUMENTS

| | | | | |
|---|---|---|---|---|
| 6,067,084 | A * | 5/2000 | Fado | G06F 3/165 434/379 |
| 6,266,571 | B1 * | 7/2001 | Fado | G06F 3/165 381/123 |
| 6,492,999 | B1 * | 12/2002 | Fado | H04R 5/00 715/709 |
| 6,504,553 | B2 * | 1/2003 | Fado | G06F 11/328 713/1 |
| 6,912,500 | B2 * | 6/2005 | Hickey | G11B 19/025 704/270 |
| 7,073,125 | B1 * | 7/2006 | Nystrom | B60K 35/00 33/501 |
| 7,190,794 | B2 * | 3/2007 | Hinde | G11B 19/025 381/17 |
| 7,461,345 | B2 * | 12/2008 | Lettau | G01C 21/367 701/532 |
| 7,549,123 | B1 * | 6/2009 | Stewart | G06F 3/0483 381/119 |
| 8,751,934 | B2 * | 6/2014 | Young | G06F 3/0482 715/716 |
| 8,805,561 | B2 * | 8/2014 | Wilcock | G06F 3/167 381/18 |
| 8,923,995 | B2 * | 12/2014 | Lindahl | 700/94 |
| 2003/0227476 | A1 * | 12/2003 | Wilcock | G11B 19/025 715/727 |
| 2004/0264704 | A1 | 12/2004 | Huin et al. | |
| 2006/0133628 | A1 * | 6/2006 | Trivi | G10H 1/0066 381/310 |
| 2006/0277034 | A1 | 12/2006 | Sferrazza | |
| 2006/0280323 | A1 | 12/2006 | Neidich et al. | |
| 2008/0137870 | A1 | 6/2008 | Nicol et al. | |
| 2008/0178088 | A1 * | 7/2008 | Goldstein | G06Q 30/02 715/727 |
| 2008/0243278 | A1 * | 10/2008 | Dalton | H04S 7/304 700/94 |
| 2008/0306720 | A1 | 12/2008 | Nicol et al. | |
| 2010/0092016 | A1 * | 4/2010 | Iwano | H04R 25/407 381/313 |
| 2012/0022842 | A1 | 1/2012 | Amadu | |
| 2012/0093348 | A1 | 4/2012 | Li | |
| 2012/0117502 | A1 * | 5/2012 | Nguyen | G06T 7/0065 715/769 |
| 2012/0124470 | A1 * | 5/2012 | West | G06F 3/0488 715/702 |
| 2012/0201405 | A1 * | 8/2012 | Slamka | H04S 7/306 381/307 |
| 2012/0328107 | A1 * | 12/2012 | Nystrom | H04S 7/303 381/17 |
| 2013/0163765 | A1 * | 6/2013 | De Jong | H04S 7/304 381/17 |
| 2013/0177166 | A1 * | 7/2013 | Agevik | H04R 3/00 381/74 |
| 2013/0223658 | A1 * | 8/2013 | Betlehem | H04S 3/002 381/307 |
| 2015/0052455 | A1 * | 2/2015 | Boustead | G06F 3/0484 715/753 |
| 2015/0293655 | A1 * | 10/2015 | Tan | G06F 3/0486 715/727 |

OTHER PUBLICATIONS

First Office Action issued Feb. 3, 2016, for Chinese Patent Application No. 201280078150.3.

Extended European Search Report for EP application No. 12888662.9 mailed May 11, 2016.

* cited by examiner

METHOD FOR OUTPUTTING A MODIFIED AUDIO SIGNAL AND GRAPHICAL USER INTERFACES PRODUCED BY AN APPLICATION PROGRAM

CROSS-REFERENCE TO RELATED APPLICATIONS

This application is a national stage entry of PCT/SG2012/000439 filed Nov. 22, 2012, said application is expressly incorporated herein in its entirety.

TECHNICAL FIELD

Various embodiments generally relate to methods for outputting a modified audio signal and to graphical user interfaces produced by an application program.

BACKGROUND

A head-reflectance transfer function (or head-related transfer function; HRTF) may be applied to an incoming analog stereo audio signal in order to create the illusion of a multi-channel audio system through typical stereo headphones. This HRTF may have to be calibrated to a specific user.

SUMMARY OF THE INVENTION

According to various embodiments, a method for outputting a modified audio signal may be provided. The method may include: receiving from a user an input indicating an angle; determining a parameter for a head-related transfer function based on the received input indicating the angle; modifying an audio signal in accordance with the head-related transfer function based on the determined parameter; and outputting the modified audio signal.

According to various embodiments, a graphical user interface produced by an application program may be provided. The graphical user interface may include: an application program window generated by the application program, wherein the application program window may include: a visual representation of the user; a visual representation of a speaker on a geometric shape around the user; and an input for inputting an indication of an angle on the geometric shape with respect to the visual representation of the speaker.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. The dimensions of the various features or elements may be arbitrarily expanded or reduced for clarity. In the following description, various embodiments of the invention are described with reference to the following drawings, in which:

FIG. 5 shows a screen shot of a graphical user interface for calibrating virtual speaker positions in accordance with an embodiment;

DETAILED DESCRIPTION

Figure 1:
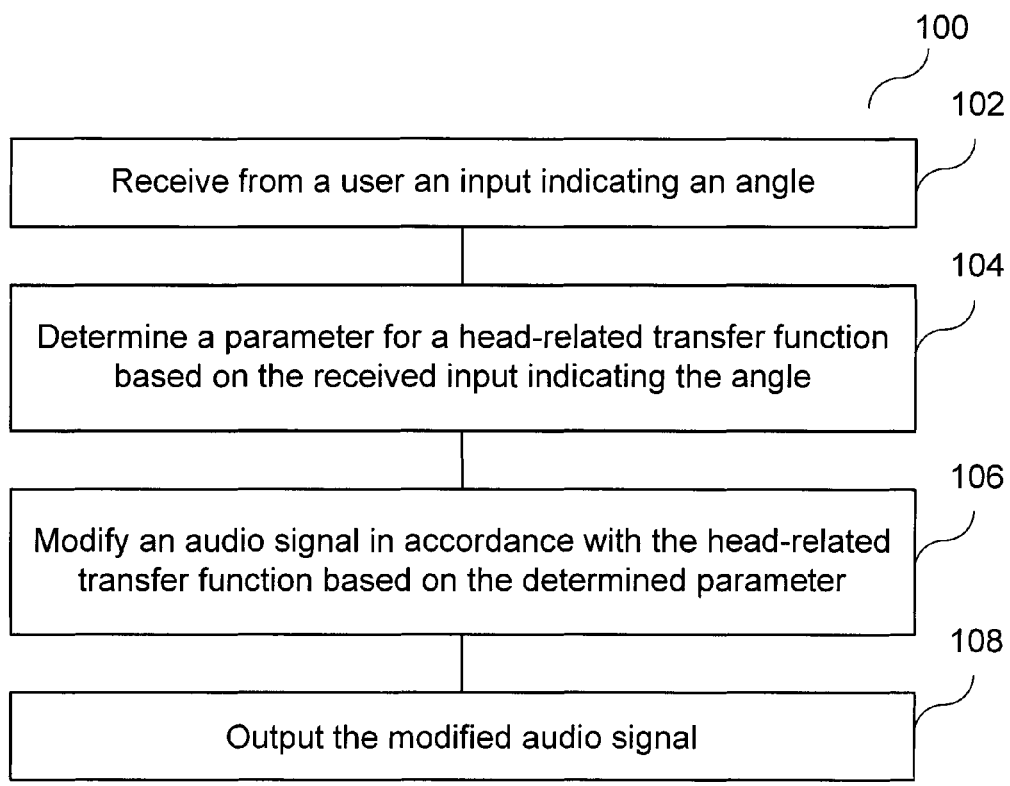
FIG. 1 shows a flow diagram illustrating a method for outputting a modified audio signal in accordance with an embodiment.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

In order that the invention may be readily understood and put into practical effect, particular embodiments will now be described by way of examples and not limitations, and with reference to the figures.

The audio output device may include a memory which is for example used in the processing carried out by the audio output device. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment. It will be understood that what is described herein as circuits with different names (for example "circuit A" and "circuit B") may also be provided in one physical circuit like described above.

It will be understood that a geometric shape may be or may include a conic section, for example a circle, an ellipse, a parabola or a hyperbola, or may include or may be a polygon, or may include or may be any other kind of geometric shape.

Various embodiments are provided for devices, and various embodiments are provided for methods. It will be understood that basic properties of the devices also hold for the methods and vice versa. Therefore, for sake of brevity, duplicate description of such properties may be omitted.

It will be understood that any property described herein for a specific device may also hold for any device described herein. It will be understood that any property described herein for a specific method may also hold for any method described herein. Furthermore, it will be understand that for any device or method described herein, not necessarily all the components or steps described must be enclosed in the device or method, but only some (but not all) components or steps may be enclosed.

FIG. 1 shows a flow diagram 100 illustrating a method for outputting a modified audio signal in accordance with an embodiment. In 102, an input indicating an angle may be received from a user. In 104, a parameter (or a plurality of parameters) for a head-related transfer function may be determined based on the received input indicating the angle. In 106, an audio signal may be modified in accordance with the head-related transfer function based on the determined parameter (or the plurality of determined parameters). In 108, the modified audio signal may be output.

According to various embodiments, the input indicating the angle may be a graphical input indicating the angle by a point on a geometric shape.

According to various embodiments, the input indicating the angle may be a graphical input indicating the angle by a direction from a center of a geometric shape.

According to various embodiments, the input indicating the angle may be a real number indicating the angle.

According to various embodiments, the method may further include displaying a presently set angle. According to various embodiments, the receiving the input indicating the angle from the user may include receiving an indication for increasing or decreasing the angle in response to the displaying. According to various embodiments, the method may further include setting the angle based on the indication.

According to various embodiments, the method may further include receiving from the user an input indicating a head size of the user.

According to various embodiments, the parameter (or the plurality of parameters) for the head-related transfer function may be determined further based on the received input indicating the head size of the user.

According to various embodiments, the method may further include receiving from the user an input indicating a head shape of the user.

According to various embodiments, the parameter (or the plurality of parameters) for the head-related transfer function may be determined further based on the received input indicating the head shape of the user.

According to various embodiments, the method may further include receiving from the user an input indicating an ear size of the user.

According to various embodiments, the parameter (or the plurality of parameters) for the head-related transfer function may be determined further based on the received input indicating the ear size of the user.

According to various embodiments, the method may further include receiving from the user an input indicating an ear shape of the user.

According to various embodiments, the parameter (or the plurality of parameters) for the head-related transfer function may be determined further based on the received input indicating the ear shape of the user.

According to various embodiments, the receiving and the determining may be performed for a plurality of virtual speaker positions.

According to various embodiments, the method may further include sending the determined parameter (or plurality of determined parameters) to a server in a cloud.

According to various embodiments, the method may further include: receiving a parameter (or a plurality of parameters) for the head-related transfer function from a server in a cloud; modifying the audio signal in accordance with the head-related transfer function based on the received parameter (or the plurality of received parameters); and outputting the modified audio signal.

According to various embodiments, the parameter (or the plurality of parameters) for the head-related transfer function may be determined based on the received input indicating the angle using a lookup table storing a relation between angles and parameters (or the plurality of parameters).

Figure 2:
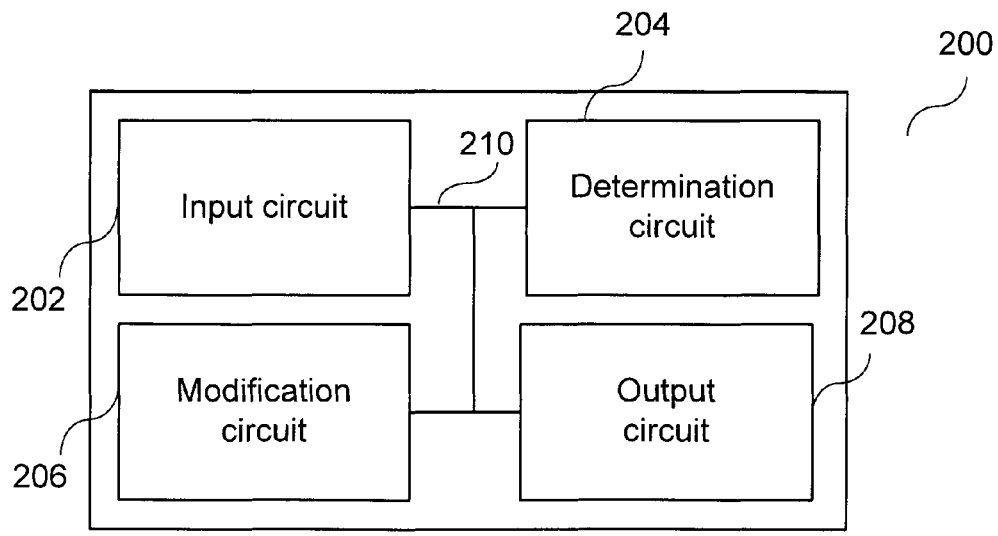
FIG. 2 shows an audio output device in accordance with an embodiment.

FIG. 2 shows an audio output device 200 in accordance with an embodiment. The audio output device 200 may include an input circuit 202 configured to receive from a user an input indicating an angle. The audio output device 200 may further include a determination circuit 204 configured to determine a parameter (or a plurality of parameters) for a head-related transfer function based on the received input indicating the angle. The audio output device 200 may further include a modification circuit 206 configured to modify an audio signal in accordance with the head-related transfer function based on the determined parameter (or the plurality of determined parameters). The audio output device 200 may further include an output circuit 208 configured to output the modified audio signal. The input circuit 202, the determination circuit 204, the modification circuit 206, and the output circuit 208 may be connected via a connection 210 (or a plurality of separate connections), for example an electrical or optical connection, for example any kind of cable or bus.

According to various embodiments, the input circuit 202 may be configured to receive a graphical input indicating the angle by a point on a geometric shape.

According to various embodiments, the input circuit 202 may be configured to receive a graphical input indicating the angle by a direction from a center of a geometric shape.

According to various embodiments, the input circuit 202 may be configured to receive a real number indicating the angle.

According to various embodiments, the audio output device 200 may further include a display circuit (not shown) configured to display a presently set angle. According to various embodiments, the input circuit 202 may be configured to receive from the user an indication for increasing or decreasing the angle in response to the displayed presently set angle. According to various embodiments, the audio output device 200 may further include a setting circuit (not shown) configured to set the angle based on the indication.

According to various embodiments, the input circuit 202 may further be configured to receive from the user an input indicating a head size of the user.

According to various embodiments, the determination circuit 204 may further be configured to determine the parameter (or the plurality of parameters) for the head-related transfer function based on the received input indicating the head size of the user.

According to various embodiments, the input circuit 202 may further be configured to receive from the user an input indicating a head shape of the user.

According to various embodiments, the determination circuit 204 may further be configured to determine the parameter (or the plurality of parameters) for the head-related transfer function based on the received input indicating the head shape of the user.

According to various embodiments, the input circuit 202 may further be configured to receive from the user an input indicating an ear size of the user.

According to various embodiments, the determination circuit 204 may further be configured to determine the parameter (or the plurality of parameters) for the head-related transfer function based on the received input indicating the ear size of the user.

According to various embodiments, the input circuit 202 may further be configured to receive from the user an input indicating an ear shape of the user.

According to various embodiments, the determination circuit 204 may further be configured to determine the parameter (or the plurality of parameters) for the head-related transfer function based on the received input indicating the ear shape of the user.

According to various embodiments, the input circuit 202 and the determination circuit 204 may be configured to perform the receiving and the determining for a plurality of virtual speaker positions.

According to various embodiments, the audio output device 200 may further include a sending circuit (not shown) configured to send the determined parameter (or the plurality of determined parameters) to a server in a cloud.

According to various embodiments, the audio output device 200 may further include a receiving circuit (not shown) configured to receive a parameter (or a plurality of parameters) for the head-related transfer function from a server in a cloud. According to various embodiments, the modification circuit 206 may be configured to modify the audio signal in accordance with the head-related transfer function based on the received parameter (or the plurality of received parameters). According to various embodiments, the output circuit 208 may be configured to output the modified audio signal.

According to various embodiments, the determination circuit 204 may be configured to determine the parameter (or the plurality of parameters) for the head-related transfer function based on the received input indicating the angle using a lookup table storing a relation between angles and parameters (or the plurality of parameters).

Figure 3:
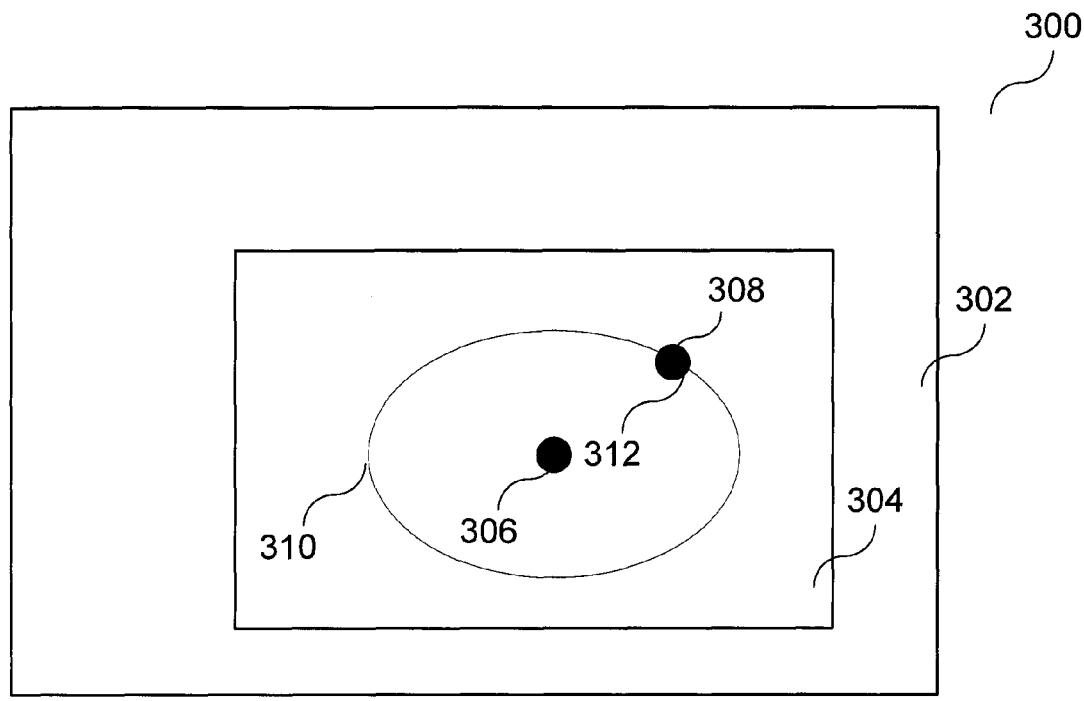
FIG. 3 shows a graphical user interface in accordance with an embodiment.

FIG. 3 shows a graphical user interface 300 in accordance with an embodiment. The graphical user interface 300 may for example be displayed on a computer screen 302. The graphical user interface 300 may include an application program window 304 generated by the application program. The application program window 304 may include a visual representation 306 of the user (here shown as a geometric shape). The application program window 304 may further include a visual representation 308 of a speaker (here shown as a geometric shape) on a geometric shape 310 around the user. It will be understood that the geometric shape 310 in the graphical user interface may be displayed as any kind of geometrical form, for example an ellipse, wherein the user 306 is located at the center of the geometric shape, for example the ellipse 310. The speaker 308 is movable along the geometric shape 310, wherein the positioning of the speaker 308 translates to inputting an indication of an angle on the geometric shape 310 with respect to the user 306. In an alternative embodiment, the application program window 304 may further include an input 312 for inputting an indication of an angle on the geometric shape with respect to the visual representation of the speaker (here shown as a geometric shape that may be moved on the geometric shape 310), wherein the input 312 is associated to the speaker 308. The moving of the speaker 308 adjusts the angle.

Figure 4:
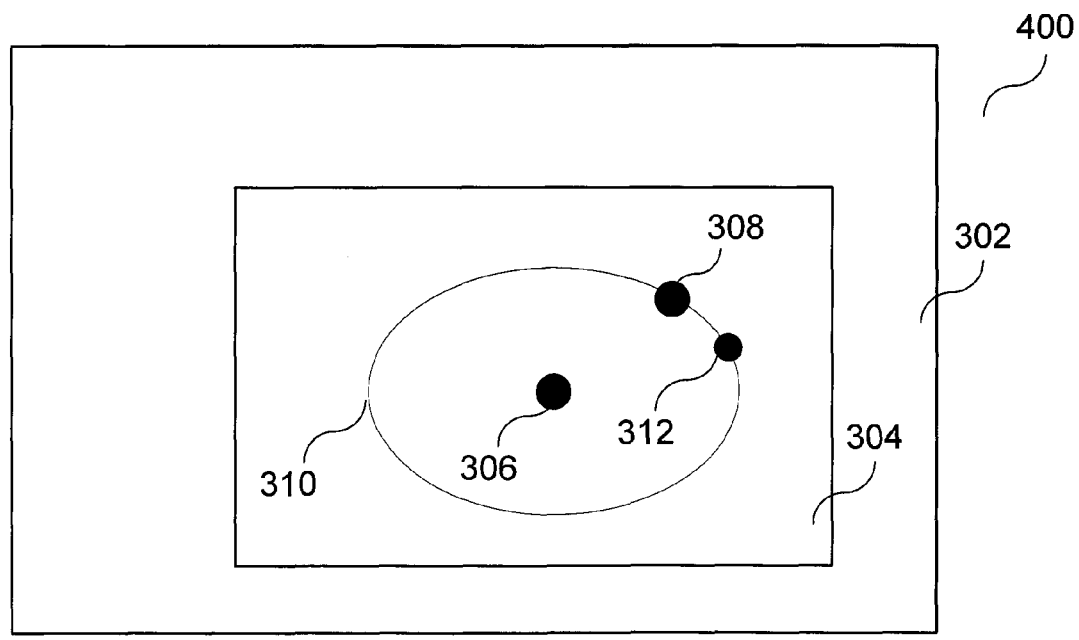
FIG. 4 shows a graphical user interface in accordance with an embodiment.

FIG. 4 shows an alternative implementation 400. In the alternative implementation, a movable input 312 may be used to adjust the angle.

According to various embodiments, the visual representation 308 of the speaker may include an image of a speaker or other images of output speaker device.

According to various embodiments, the visual representation 308 of the speaker may include a ball.

According to various embodiments, the input 312 may include a marker configured to be moved on the geometric shape 310.

According to various embodiments, the input 312 may include the visual representation of the speaker configured to be moved on the geometric shape.

According to various embodiments, the visual representation 308 of the speaker or the input 312 may include a needle of a compass configured to be moved around the geometric shape 310 with respect to the user 306.

According to various embodiments, the graphical user interface 300 may be configured to send the input indication of the angle to the application program.

According to various embodiments, the application program may be configured to: determine a parameter (or a plurality of parameters) for a head-related transfer function based on the received input indicating the angle, modify an audio signal in accordance with the head-related transfer function based on the determined parameter (or the plurality of determined parameters); and output the modified audio signal.

According to various embodiments, the application program window 304 may further be configured to receive from the user an input indicating a head size of the user.

According to various embodiments, the application program may further be configured to determine the parameter (or the plurality of parameters) for the head-related transfer function further based on the received input indicating the head size of the user.

According to various embodiments, the application program window 304 may further be configured to receive from the user an input indicating a head shape of the user.

According to various embodiments, the application program may further be configured to determine the parameter (or the plurality of parameters) for the head-related transfer function further based on the received input indicating the head shape of the user.

According to various embodiments, the application program window 304 may further be configured to receive from the user an input indicating an ear size of the user.

According to various embodiments, the application program may further be configured to determine the parameter (or the plurality of parameters) for the head-related transfer function further based on the received input indicating the ear size of the user.

According to various embodiments, the application program window 304 may further be configured to receive from the user an input indicating an ear shape of the user.

According to various embodiments, the application program may further be configured to determine the parameter (or the plurality of parameters) for the head-related transfer function further based on the received input indicating the ear shape of the user.

According to various embodiments, the application program window 304 may include visual representations of a plurality of speakers and the input 312 may be for inputting an angle for each of the visual representation of each speaker.

According to various embodiments, the application program window 304 may further include a sender input for receiving an input for instructing the application program to send a parameter (or a plurality of parameters) determined based on the input angle to a server in a cloud.

According to various embodiments, the application program window 304 may further include a receiver for receiving a parameter (or a plurality of parameters) for a head-related transfer function from a server in a cloud. According to various embodiments, the application program may be configured to modify the audio signal in accordance with the head-related transfer function based on the received parameter (or the plurality of received parameters) and to output the modified audio signal.

According to various embodiments, the application program may be configured to determine a parameter (or a plurality of parameters) for a head-related transfer function based on the input indication of the angle using a lookup table storing a relation between angles and parameters (or the plurality of parameters) for the head-related transfer function.

According to various embodiments, there may be seven speakers in the graphical user interface (UI), and the seven speakers may represent a 7.1 sound system. Typical sound systems may be 5.1 (e.g. cinema theatre). So, the UI may be provided to (i) allow user to calibrate the sound setting of a 7.1 audio headset and/or (ii) perform virtualization so that a 2.1 or 5.1 headset sounds like a 7.1 system to the user.

According to various embodiments, a method of HRTF calibration may be provided.

A head-reflectance transfer function (or head-related transfer function; HRTF) may be applied to an incoming analog stereo audio signal in order to create the illusion of a multi-channel audio system through typical stereo headphones. According to various embodiments, a method of calibrating an HRTF system using a graphical user interface to position virtual speaker positions may be provided, in a way which is easy to understand and manipulate by a novice user with no prior experience in tuning an HRTF. According to various embodiments, further the association of the HRTF calibration parameters determined by the user with a unique cloud identifier for that user, storing these settings for use across any device connecting to the cloud service may be provided. Cloud identification may enable not only the storage of an HRTF calibration profile for a particular user, but also the machine and devices in the audio reproduction environment such as the digital-to-analog converter (DAC), headphone amplifier, and the headphones or headset used to reproduce sound.

A head-related transfer function (HRTF) may be a response that may describe how an ear receives a sound from a point in space; a pair of HRTFs for two ears may be used to synthesize a binaural sound that seems to come from a particular point in space. It may be a transfer function, describing how a sound from a specific point will arrive at the ear (generally at the outer end of the auditory canal). Some consumer home entertainment products designed to reproduce surround sound from stereo (two-speaker) headphones may use HRTFs. Some forms of HRTF-processing may have also been included in computer software to simulate surround sound playback from loudspeakers.

Humans have just two ears, but can locate sounds in three dimensions—in range (distance), in direction above and below, in front and to the rear, as well as to either side. This may be possible because the brain, inner ear and the external ears (pinna) may work together to make inferences about location. This ability to localize sound sources may have developed in humans as an evolutionary necessity, since the eyes may only see a fraction of the world around a viewer, and vision may be hampered in darkness, while the ability to localize a sound source works in all directions, to varying accuracy, and even in the dark.

Humans may estimate the location of a source by taking cues derived from one ear (monaural cues), and by comparing cues received at both ears (difference cues or binaural cues). Among the difference cues may be time differences of arrival and intensity differences. The monaural cues may come from the interaction between the sound source and the human anatomy, in which the original source sound may be modified before it enters the ear canal for processing by the auditory system. These modifications may encode the source location, and may be captured via an impulse response which may relate the source location and the ear location. This impulse response may be termed the head-related impulse response (HRIR). Convolution of an arbitrary source sound with the HRIR may convert the sound to that which would have been heard by the listener if it had been played at the source location, with the listener's ear at the receiver location. HRIRs may have been used to produce virtual surround sound.

The HRTF may be the Fourier transform of HRIR. The HRTF may also be referred to as the anatomical transfer function (ATF).

HRTFs for left and right ear (expressed above as HRIRs) may describe the filtering of a sound source (x(t)) before it is perceived at the left and right ears as xL(t) and xR(t), respectively.

The HRTF may also be described as the modifications to a sound from a direction in free air to the sound as it arrives at the eardrum. These modifications may include the shape of the listener's outer ear, the shape of the listener's head and body, the acoustical properties of the space in which the sound is played, and so on. All these properties may influence how (or whether) a listener may accurately tell what direction a sound is coming from.

HRTFs may vary significantly from person to person. Perceptual distortions may occur when one listens to sounds spatialized with non-individualized HRTF. This focus on a "one size fits all" approach to HRTF may assume average physiology and morphology across all users. The size of the head and placement of the headphones or headset may be a critical determining factor in how the coefficients are created and applied to the filter. Additionally, the shape of the ear and size of the ears may have a major impact on how sounds propagate from the drivers to the inner ear. As such, one size or type of filter does not fit all listeners, resulting in poor performance of the virtual surround sound system as it targets the average values found across all humans.

Additionally, a user may establish settings which may be unique to that user, and those settings may not persist across multiple systems and device chains, as the parameters established by the user during calibration remain locked into that particular device for which settings were configured.

According to various embodiments, the user may calibrate the HRTF filter so that it works best for them, and then may save those settings to the client and mirroring them into the cloud for use on any client in the future. By associating the HRTF calibration parameters used on one audio reproduction system (such as a personal computer) with a unique cloud identification system, the user may configure or calibrate the HRTF algorithm on a singular device or system and have those systems persist across a multitude of devices and systems through software interface which authenticate them and transport their profile settings from the cloud into that system.

By allowing the user to provide more information about their morphological parameters such as head size, ear size and shape of the ears, as well as positioning of the virtual surround sound positions within the sound field, the listener may be provided with a much more accurate and personalized virtual surround sound experience.

According to various embodiments, a graphical user interface for the calibration of an HRTF and cloud services which synchronize a singular device or system with a multitude of devices and systems through the use of unique identifiers for the user and the device(s) and machine(s) used to calibrate the HRTF algorithm may be provided. This may be based on user input to determine offsets in the virtual speaker positions, selection of head size, ear size and ear shape, which determine the appropriate HRTF coefficients to apply within the audio filter. For example, HRTF coefficients may be stored in the cloud and downloaded to the client, or may be included in the installation and local-only. Once the user calibrates, and selections of HRTF coefficients are made, the user's chosen configuration may be stored in the cloud for use on any other PC client they log into.

The first selection that a user may make is his or her head size, which may be a subjective selection given a set of options such as small, medium and large, corresponding to the circumference of the head as measured at the brow and around the largest area of the back of the head. This may be similar in approach to that of hat size measurement. The options may be relative to an average circumference of 58 cm, with a standard deviation of +/−7 cm.

The second selection that a user may make is his or her head shape, based on a set of provided options such as round, oval, and inverted egg.

The third selection that a user may make is his or her ear size, which may be a subjective selection given a set of options such as small, medium and large, corresponding to the size of their outer ear (pinna, or auricle) relative to an average of 6 cm with a standard deviation of +/−1.5 cm.

The fourth selection that a user makes may make is his or her ear shape, which may be a subjective selection by the user of 8 common ear shape types.

Figure 5A:
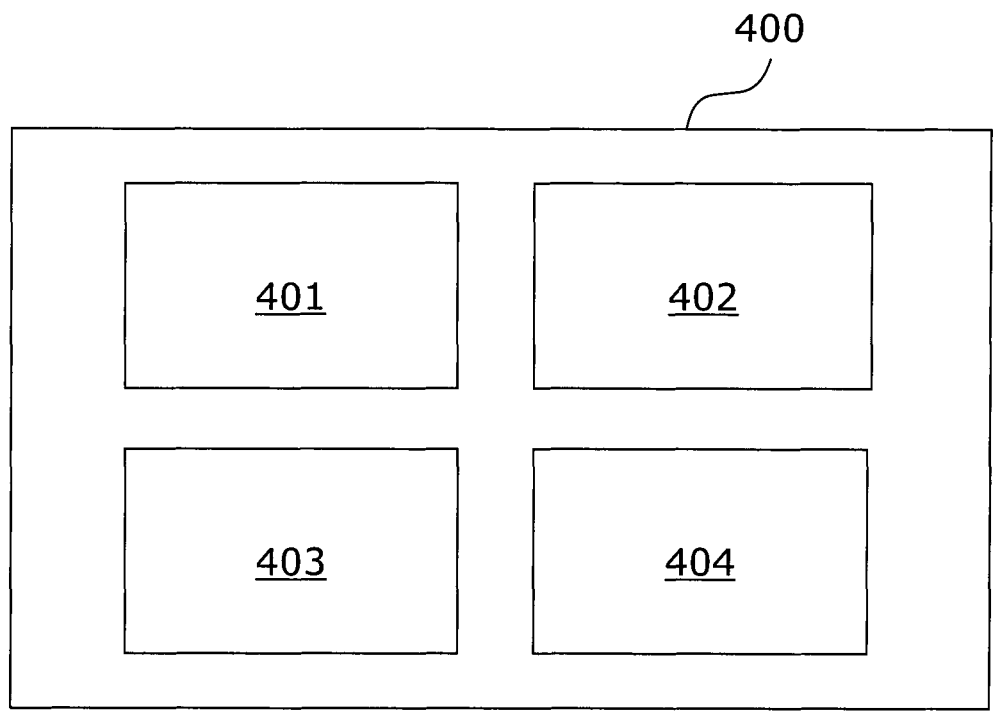
FIG. 5A shows a diagram of an application program window in accordance with one embodiment.

FIG. 5A is a diagram of an application program window 400 in accordance with one embodiment of the present invention. The application program window 400 includes a first sub-window 401, a second sub-window 402, a third sub-window 403 and a fourth sub-window 404. The first sub-window 401 provides means for the users to select their head size. For example, the first sub-window 401 includes an input window for the user to input/type their head circumference size. In another embodiment, the first sub-window 401 may contain a drop-down menu/list with preset head circumference sizes, e.g. from 51 cm to 65 cm, wherein the preset sizes are selectable by the user. In yet another embodiment, the first sub-window 401 includes a plurality of images illustrating the different head sizes, e.g. a first image with a range of 51 cm-55 cm, a second image with a range of 56 cm-60 cm, and a third image with a range of 61 cm-65 cm. The users select the image with the closest range to their head size. Alternatively, the first sub-window may be a combination of the input window, the drop-down menu, or the plurality of images to allow flexibility in selecting the head size.

The second sub-window 402 provides means for the users to select their head shape. In one embodiment, the second sub-window 402 includes a drop-down menu/list with preset head shapes, e.g. round, oval, and inverted egg, which are selectable by the user. In another embodiment, the second sub-window 402 includes a plurality of images illustrating the different head shapes, and the users select the closest image to their head shape. In yet another embodiment, the second sub-window 402 is a combination of the drop-down menu with preset head shapes and plurality of images with different head shapes.

The third sub-window 403 provides means for the users to select their ear size. In one embodiment, the third sub-window 403 includes an input window for the user to input/type their ear size. In another embodiment, the third sub-window 403 may contain a drop-down menu/list with preset ear sizes, e.g. outer ear size of about 4.5 cm to 7.5 cm, wherein the preset sizes are selectable by the user. In yet another embodiment, the third sub-window 403 includes a plurality of images illustrating the different ear sizes, e.g. a first image with a range of 4.5 cm-5.0 cm, a second image with a range of 5.1 cm-5.5 cm, a third image with a range of 5.6 cm-6.0 cm, etc. The users select the image with the closest range to their ear size. Alternatively, the third sub-window 403 may be a combination of the input window, the drop-down menu, or the plurality of images.

Figure 5B:
FIG. 5B shows a plurality of ear shapes.

The fourth sub-window 404 provides means for the users to select their ear shape. In one embodiment, the fourth sub-window 404 includes a plurality of images illustrating the different ear shapes to allow the users to select their ear shape that is closest to one of the images. FIG. 5B shows the fourth sub-window 404 with a plurality of images representing common ear shapes.

According to various embodiments, further adjustments may be to the positioning of virtual surround sound speaker locations by the user, to personalize his or her listening experience. This method may enable the user to more fully realize the surround sound spatiality by making adjustments to the virtual speaker location in the graphical user interface, which may be translated into adjustments to the HRTF coefficients for each speaker positions. The results of such a graphical method of calibration may be immediately apparent to the user, as he or she may perceive the changes in virtual speaker positions during the calibration steps.

In one embodiment, the method may begin by instructing the user to place his or her preferred headphones onto his or her head, while an audio clip is playing which cycles through the default virtual speaker locations. The user may hear what these default positions sound like given his or her morphological parameters such as head size and ear shape, as well as the mechanical design and other characteristics of his or her preferred headphones.

Figure 6A:
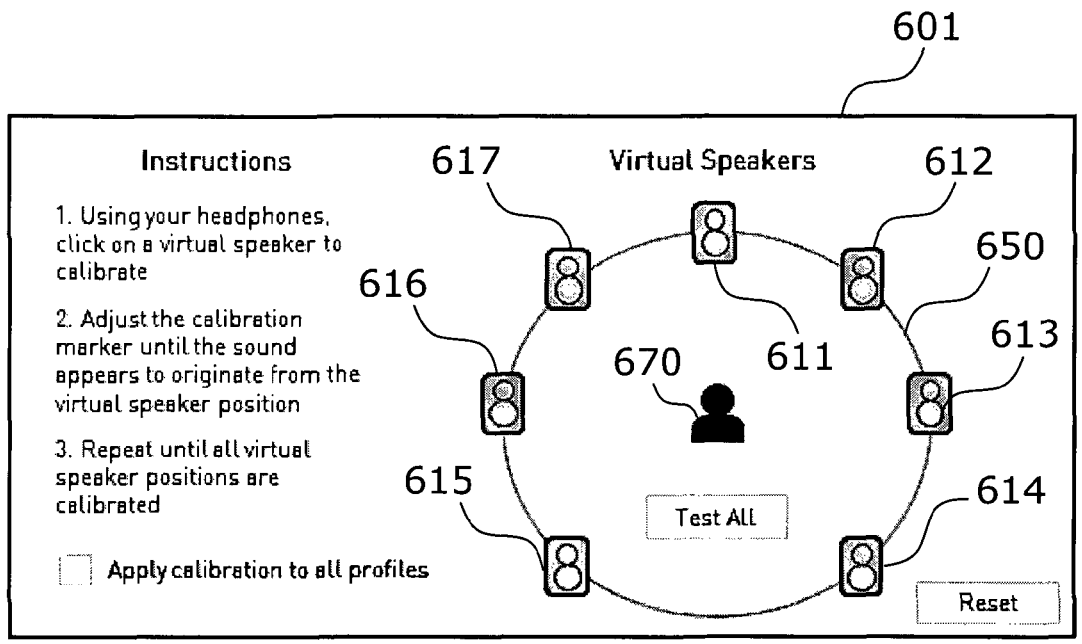
FIG. 6A shows a screen shot of a graphical user interface for calibrating virtual speaker positions in accordance with an embodiment.

FIG. 6A shows a screen shot 601 of a graphical user interface for calibrating virtual speaker positions in accordance with an embodiment. The user may select one of the virtual speaker locations 611 to 617 and may be presented with a respective marker highlighting the position of the audio at the default angle (azimuth) relative to the head/user representation 670 at the center of the sound field.

Figure 6B:
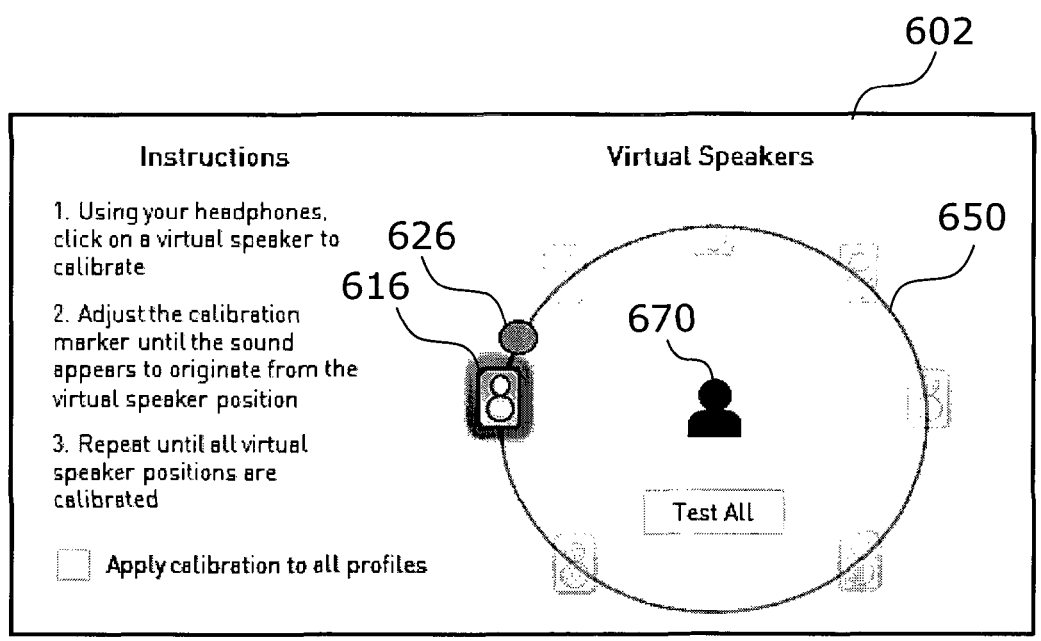
FIG. 6B shows a screen shot of a graphical user interface in accordance with an embodiment, wherein a virtual speaker location marker is shown when the virtual speaker location 616 is selected.

FIG. 6B shows a screen shot 602 of a graphical user interface in accordance with an embodiment, wherein a virtual speaker location marker 626 is shown when the virtual speaker location 616 is selected. The user may choose to adjust the position of this marker 626 that is associated only to virtual speaker location 616, which may result in adjustments made to the HRTF coefficients applied by the filter, in order to shift the perceived audio origination point (from the virtual speaker location 616) around the sound field. For example, by positioning of the virtual surround sound speaker locations by the user, the user may "freely" shift/move the 7 virtual speaker locations 611 to 617 within the geometric shape 650.

By repeating this process of selecting a speaker location and then adjusting the point of origin of the sounds played through the filter and originating at this point, the user may fully customize the sound field to his or her preference. According to various embodiments, this may enable the user to achieve a subjectively better virtual surround sound audio experience through real-time adjustments of the speaker positions with a synthesized multi-channel surround sound audio source playing through the HRTF filter being modified.

When the user has completed making all desired changes to the virtual speaker locations, the new HRTF coefficients may be saved for that particular user and optionally associated with his or her preferred headphones. Other HRTF calibrations may be performed for other headphones, enabling the user to customize and calibrate his or her HRTF filter library for a plurality of headphone or headset devices.

By incorporating a graphical user interface for the user to select morphological parameters, and adjust the virtual speaker locations used to determine the HRTF coefficients used in the synthesis of multi-channel surround sound audio from a stereo audio signal, users may overcome the standard "one size fits all" approach of HRTF filters and may be provided with a calibrated virtual surround sound experience. According to various embodiments, it may be ensured that, while subjective, the filters used to synthesize the virtual surround sound environment may be tuned for the user's particular desires of the filter as well as his or her preferred headphone or headset type.

Further, by saving these settings for the user both locally on the device or system and mirroring those settings via cloud services, the appropriate HRTF filter coefficients may be applied to a wide variety of applications, and may persist across multiple devices and systems used by the user. This may ensure the best possible virtual surround sound experience no matter which system the user is currently using.

The current state of HRTF calibration may be limited to a standard set of predetermined filters, created based on objective morphological factors and may not present the user with affordances for calibrating their virtual surround sound experience using a graphical user interface to select their morphological parameters and control the positioning of virtual surround sound speaker positions.

Further, according to various embodiments, the state of the art may be advanced according to various embodiments by associating a unique profile created by the user for their device(s) and system(s) with their unique identification in the cloud service, enabling a consistent experience across multiple devices through connectivity of HRTF calibration software to the cloud service.

Figure 7:
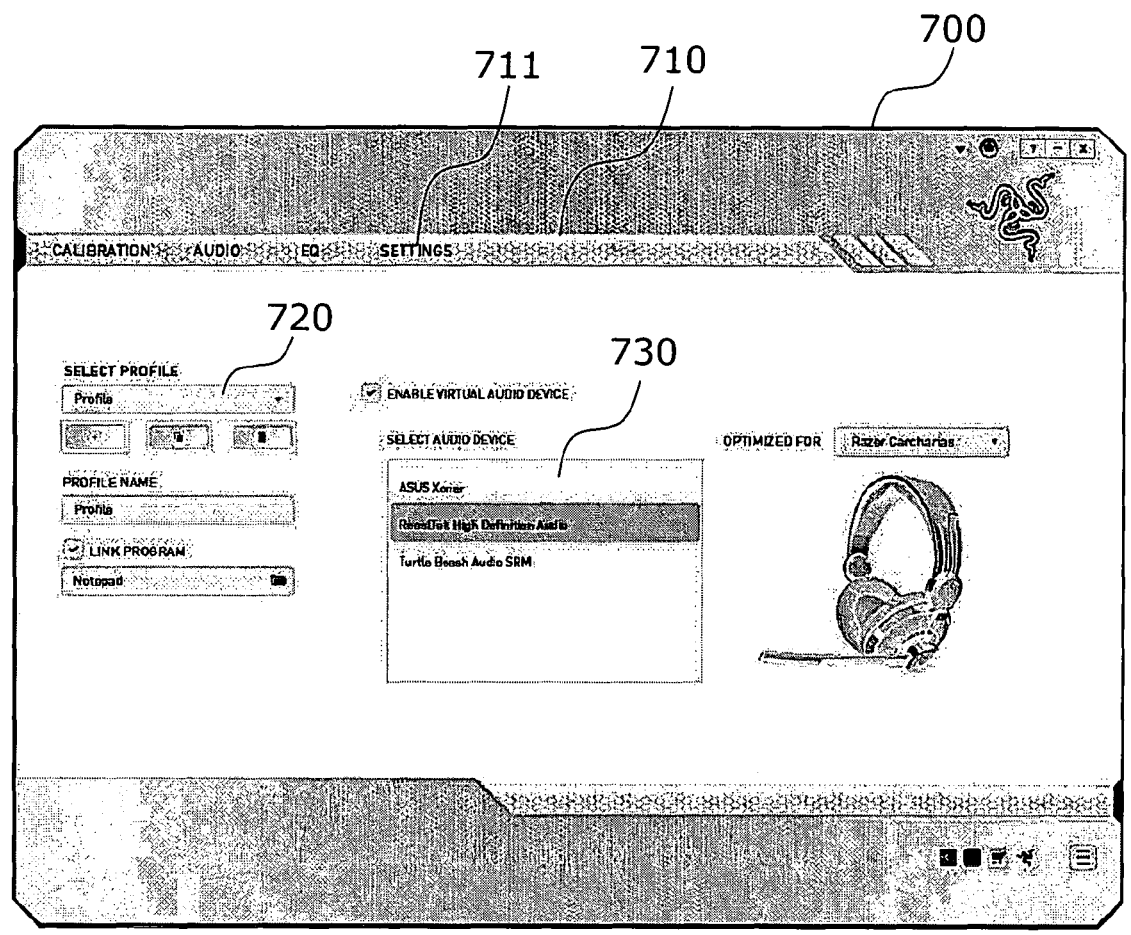
FIG. 7 shows a screen shot of a graphical user interface or application program window in accordance with an embodiment, wherein an audio output device may be set.

FIG. 7 shows a screen shot 700 of a graphical user interface or application program window in accordance with an embodiment, wherein an audio output device may be set. The application program window 700 is generated by the application program operating on a computing device. The application program is connected to a remote server over a network (e.g. Internet cloud service), wherein the application program stores user profiles on the remote server or receives stored user profiles from the remote server. When the user logins to the application program (e.g. by a unique user identification (ID) and password), the application program retrieves the stored user profiles associated with the user ID from the remote server and displays it in the on a profile sub-window 720 of the application program window 700. The profile sub-window 720 displays a list of user profiles and also enables new profiles to be created, wherein the list of user profiles is retrievable from the remote server or from the local client (i.e. the computer device). When a particular user profile is selected (e.g. "Profile" shown in FIG. 7), an audio device sub-window 730 displays a list of audio devices associated with the user profile. For example, all Razer analog headphones and headsets may be provided in the list of audio devices and one of them may be selected for calibration. When a new headphone/headset is connected the computing device, the application program displays the name of the new headphone/headset in the audio device sub-window 730 if it is compatible with the application program. In one embodiment, the application program window 700 comprises a top menu bar 710, including the functions "SETTINGS", "AUDIO", "EQ" and "CALIBRATION". FIG. 7 shows the application program window 700 when the "SETTINGS" 711 function is selected by the user.

Figure 8:
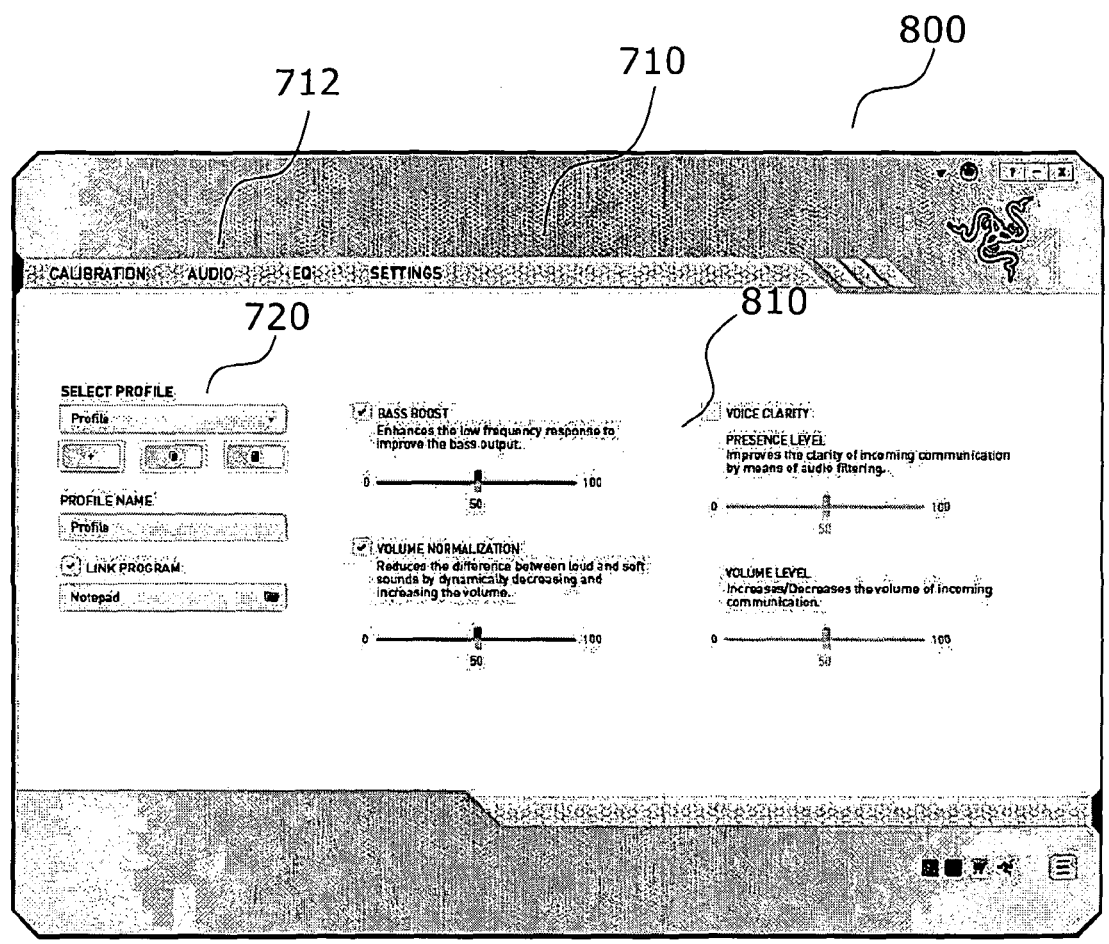
FIG. 8 shows a screen shot of a graphical user interface or application program window in accordance with an embodiment, wherein general audio output parameters may be set.

FIG. 8 shows a screen shot 800 of a graphical user interface or application program window in accordance with an embodiment, wherein general audio output parameters may be set. When the "AUDIO" function 712 is selected from the top menu bar 710, the application program window 800 displays an audio output sub-window 810 as well as the profile sub-window 720. The audio output sub-window 810 enables the user to adjust audio output parameters, such as but not limited to "BASS BOOST", "VOICE CLARITY", "VOLUME NORMALIZATION" and "VOLUME LEVEL". When the adjustment of the audio output parameters is complete, the application program associates or stores the data of the desired audio output parameters to the selected profile in the profile sub-window 720. The profile and the associated audio output parameters can then be stored on the remote server over the network so that it is retrievable by the user when he/she subsequently logins to the application program using the same user ID and password.

Figure 9:
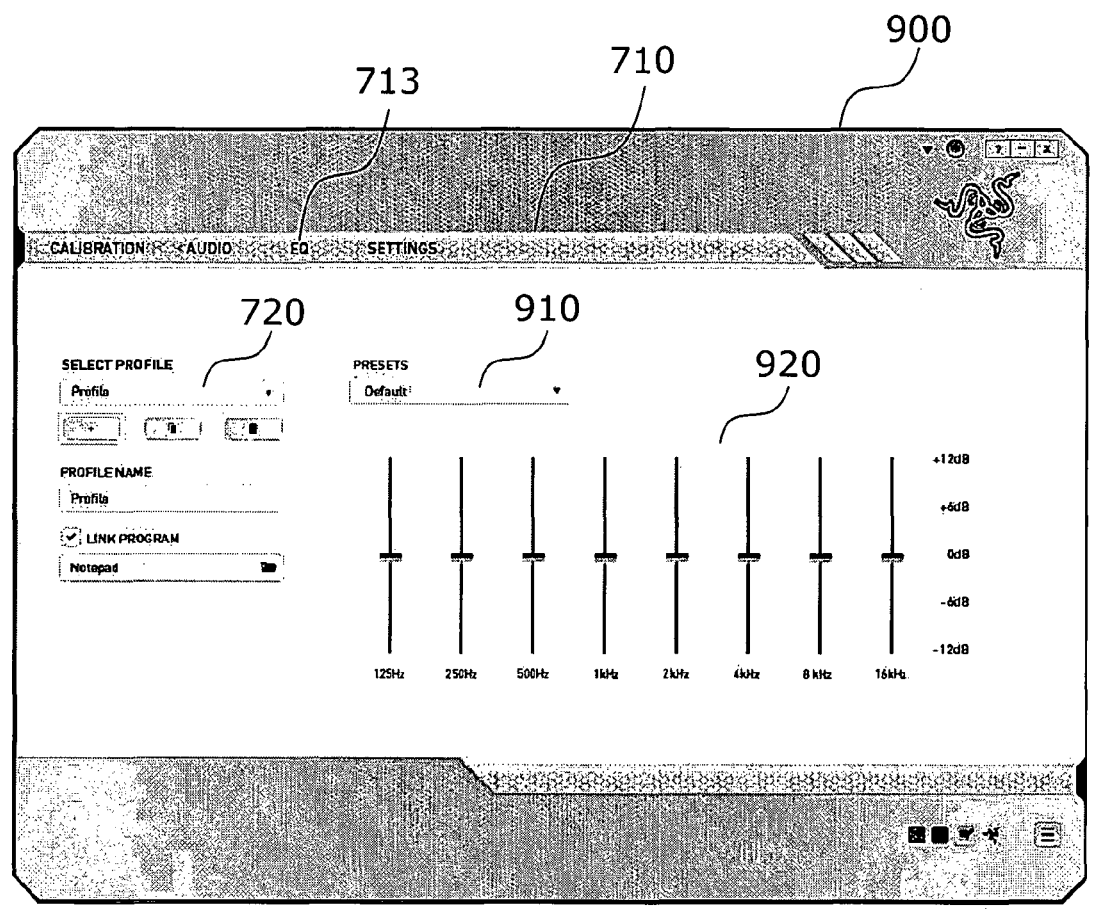
FIG. 9 shows a screen shot of a graphical user interface or application program window in accordance with an embodiment, wherein equalizer parameters may be set.

FIG. 9 shows a screen shot 900 of a graphical user interface or application program window in accordance with an embodiment, wherein equalizer (EQ) parameters may be set. When the "EQ" function 713 is selected from the top menu bar 710, the application program window 900 displays a drop-down menu with preset EQ settings 910, wherein the drop-down menu may include common EQ settings such as but not limited to "Classical", "Rock", "Dance", "Jazz", etc. Alternatively, the application program window 900 includes a plurality of EQ frequency bars that enables user to configure the desired EQ settings. Similarly, the application program window 900 includes the profile sub-window 720. When the adjustment of the EQ settings is complete, the application program associates or stores the data of the desired EQ settings to the selected profile in the profile sub-window 720. The profile and the associated EQ settings can then be stored on the remote server over the network so that it is retrievable by the user when he/she subsequently logins to the application program using the same user ID and password.

Figure 10:
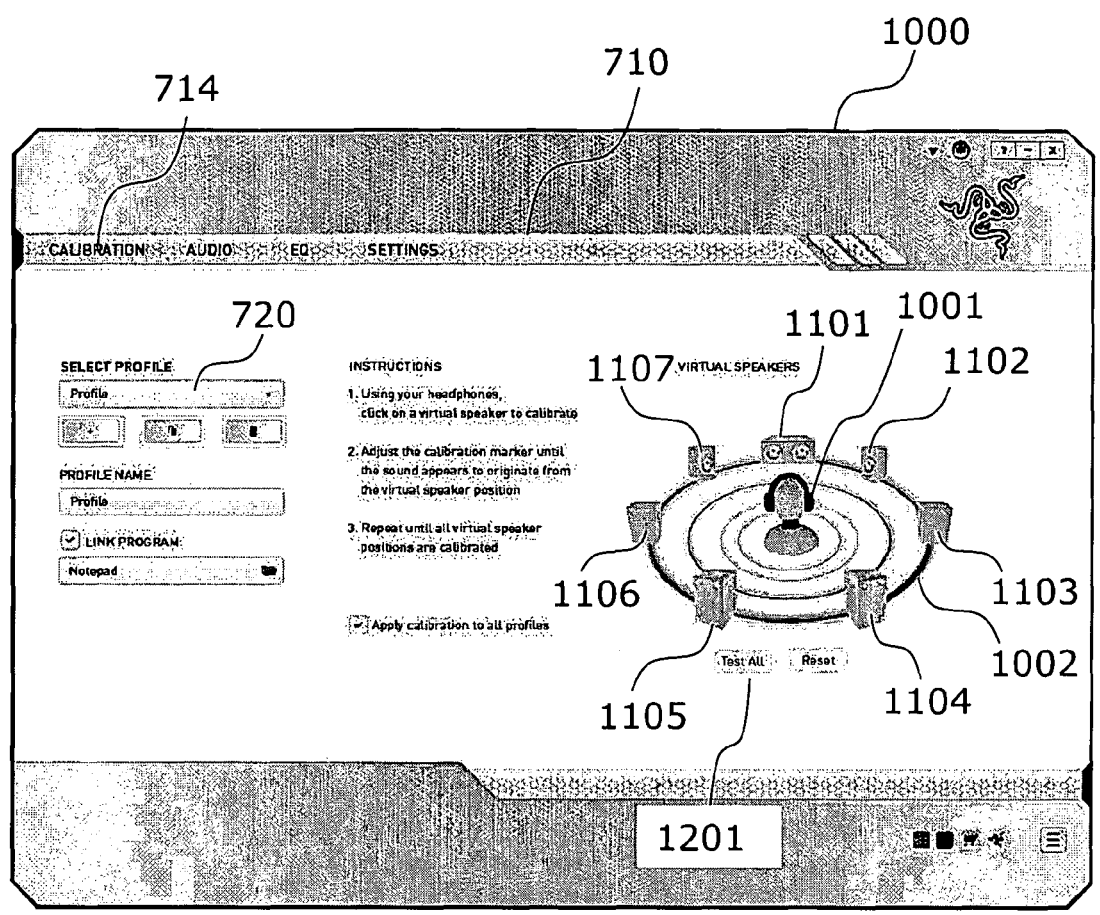
FIG. 10 shows a screen shot of a graphical user interface or application program window in accordance with an embodiment, wherein the position of a virtual speaker may be adjusted.

FIG. 10 shows a screen shot 1000 of a graphical user interface or application program window in accordance with an embodiment, wherein the position of a virtual speaker may be adjusted. When the "CALIBRATION" function 714 is selected from the top menu bar 710, the application program window 1000 displays a representation of a plurality of speakers 1101-1107 arranged on a circular path 1002. A representation of a user 1001 is located at the central position of the circular path 1002. By analogy to protractor measurements, the default position of the speaker 1101 is about 0 degrees from the user 1001. For the rest, speaker 1102 is positioned around 45 degrees, speaker 1103 around 90 degrees, speaker 1104 around 135 degrees, speaker 1105 around 225 degrees, speaker 1106 around 270 degrees and speaker 1107 around 325 degrees relative to the user 1001 respectively. The 7 speakers 1101-1107 represent a 7.1 surround system but it can be appreciated that for other surround systems the number of speakers may vary, e.g. 5 speakers may be used to represent a 5.1 surround system. Furthermore, it can be appreciated that the circular path 1002 may take other forms/shapes, such as a square path of a rectangular path.

When the user first clicks on a "CALIBRATION" function 714 on the top menu bar 710 for opening the screen shown in FIG. 10, a surround sound audio loop may be playing, such as a helicopter, which may move around all the virtual speaker positions. At any time, the user may click on a "Test All" button 1201 to replay this surround sound audio loop and listen to all the speaker positions with any changes made. When the user clicks on a virtual speaker location (for example speaker 1102), the other speakers may fade away and the selected speaker may be highlighted, like shown in FIG. 11. An audio loop may play from the selected virtual speaker location.

Figure 11:
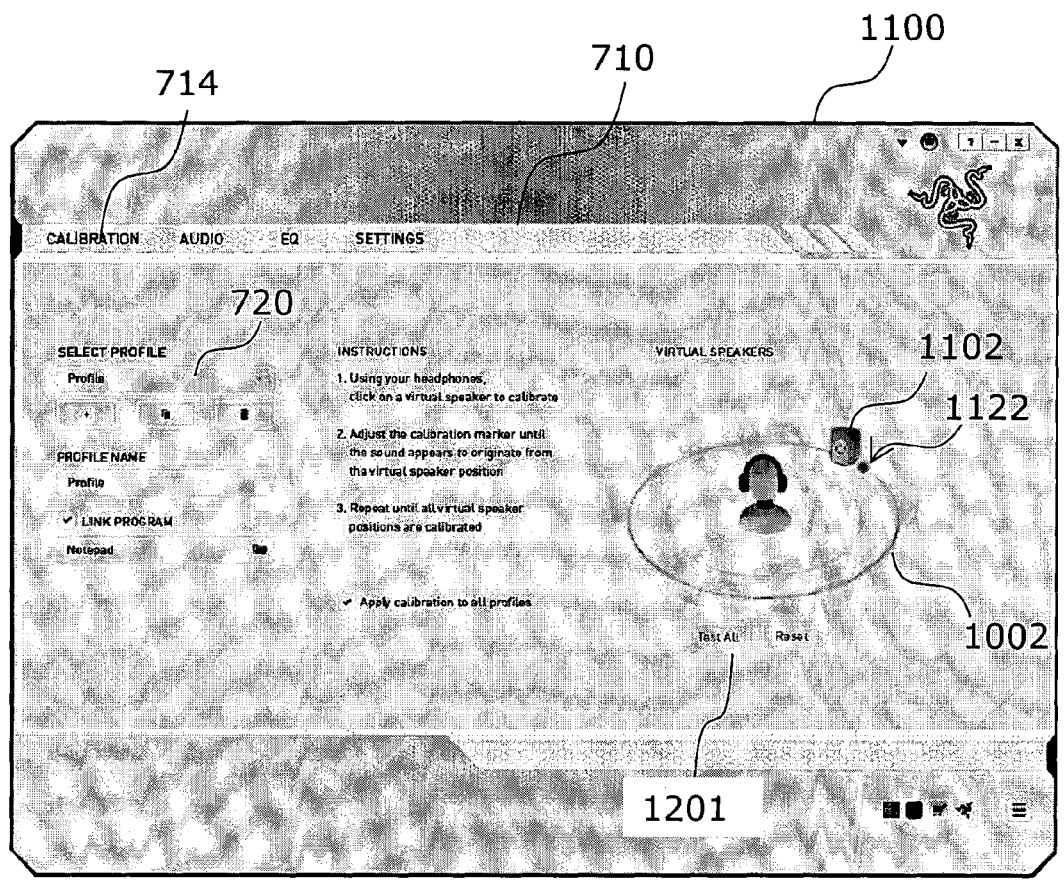
FIG. 11 shows a screen shot of a graphical user interface in accordance with an embodiment, wherein a marker indicating an angle for the chosen virtual speaker may be set.

FIG. 11 shows a screen shot 1100 of a graphical user interface in accordance with an embodiment, wherein a marker 1122 indicating an angle for the chosen virtual speaker 1102 may be set. The user may click the calibration marker 1122 (with the shape of a ball) and may drag it around the circular path 1002 to varying degrees based on the speaker 1102 selected to adjust the position of the sound until it appears to originate from the virtual speaker location, or their desired location. In one embodiment, the virtual speaker location 1102 is not moveable. The calibration marker 1122 may not end up directly on top of the speaker 1202—it may simply be an offset of the sound to account for ear and head size, headphone type, for example. In an alternative embodiment, the user interface does not include the calibration marker 1122 and the user may adjust the position of the sound from the speaker 1102 by clicking and dragging the speaker 1102 around the circular path 1002.

The adjustment of the calibration marker 1122 that is associated only to speaker 1102 results in adjustments to the HRTF coefficient associated with speaker 1102. By repeating this process of selecting a speaker and then adjusting the point of origin of the sounds played, the user may fully customize the sound field to his or her preference. When the user has completed making all desired changes to the virtual speaker locations, the new HRTF coefficients are stored with the desired profile and associated with his or her preferred headphones selected in the audio device sub-window 730 show in FIG. 7. Other HRTF calibrations may be performed for other headphones, enabling the user to customize and calibrate his or her HRTF filter library for a plurality of headphone or headset devices.

The calibration marker or speaker may be moved only to a certain degree, so as for example not to move a right speaker entirely to a left side or to move a front speaker to the rear. This helps users to maintain the audio fidelity while calibrating their headphone/headset. The azimuth for each speaker 1101-1107 may be restricted such that the user may move a selected speaker about +/−15 to 20 degrees from its default/original position. For example, as shown in the screen shot 1200 in FIG. 12, the range of angles of azimuth of speaker 1102 may be fixed to a corresponding zone/region 1132 so that the speaker 1102 (or its associated marker) is restricted from being moved outside the zone 1132. In other words, the speaker 1102 (or its associated marker) is only slidable around the circular path 1002 within the zone 1132, or moveable about +/−20 degrees from its default angle of 45 degrees (i.e. from 25 degrees to 65 degrees).

The application program determines a parameter for a HRTF based on the angle of the speaker 1102 (or its associated calibration marker). The application program then modifies an audio signal in accordance with the HRTF based on the determined parameter, resulting in the output of the modified audio signal from the speaker 1102 to the user. In one embodiment, the application program may be configured to determine a parameter for HRTF based on the input indication of the angle using a lookup table storing a relation between angles and parameters for the HRTF. When the adjustment of the speakers 1101-1107 is complete, the application program associates or stores the parameter of the HRTF to the selected profile in the profile sub-window 720. The profile and the parameters of the HRTF can then be stored on the remote server over the network so that it is retrievable by the user when he/she subsequently logins to the application program using the same user ID and password.

In one embodiment, the application program includes an interface for the user to select the size and shape of his/her head and ear (similar to FIG. 5A as discussed above) prior to the calibration of the speakers 1101-1107 shown in FIGS. 10 and 11. The application program determines the parameter for the HRTF based on the received input indicating the size and shape of the head and ear. The application program then modifies an audio signal in accordance with the HRTF based on the determined parameter, resulting in the output of the modified audio signal from the speakers 1101-1107 to the user. In one embodiment, the application program may be configured to determine a parameter for HRTF based on the input indication of the head shape, head size, ear shape or ear size using a lookup table storing a relation between the head shape, head size, ear shape, ear size and parameters for the HRTF. When the input of the size and shape of the head and ear is complete, the application program associates or stores the parameter of the HRTF to the selected profile in the profile sub-window 720. The profile and the parameters of the HRTF can then be stored on the remote server over the network so that it is retrievable by the user when he/she subsequently logins to the application program using the same user ID and password.

In one embodiment, the application program window comprises a "Reset" button to allow the user to reset the speakers 1101-1107 to their default positions.

Figure 12:
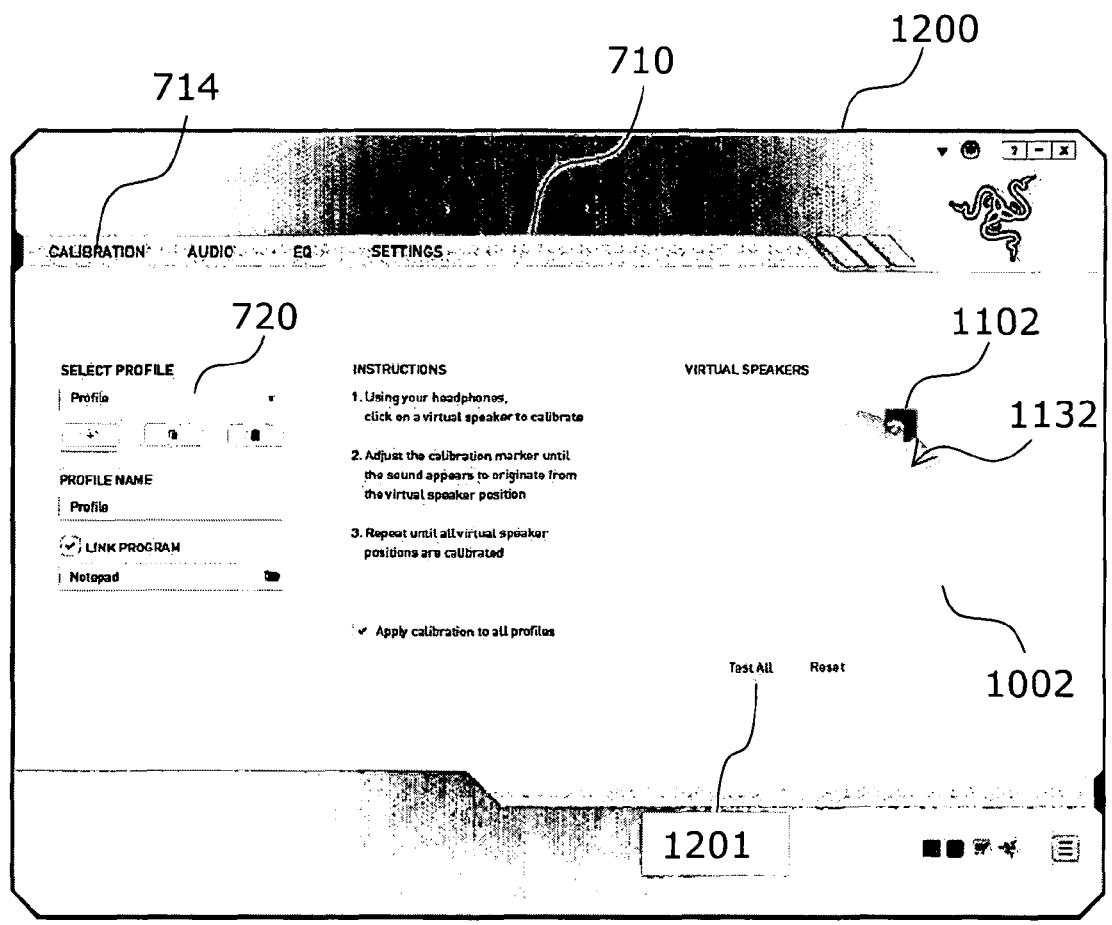
FIG. 12 shows a screen shot of a graphical user interface in accordance with an embodiment, wherein a marker indicating an angle for the chosen virtual speaker may be set.

In one embodiment, a checkbox may be provided, and checking the checkbox may override calibration settings saved to the desired profile, e.g. "Profile" shown in the profile sub-window 720 in FIG. 12 and apply the calibration settings globally to all profiles associated to the unique user ID.

Figure 13:
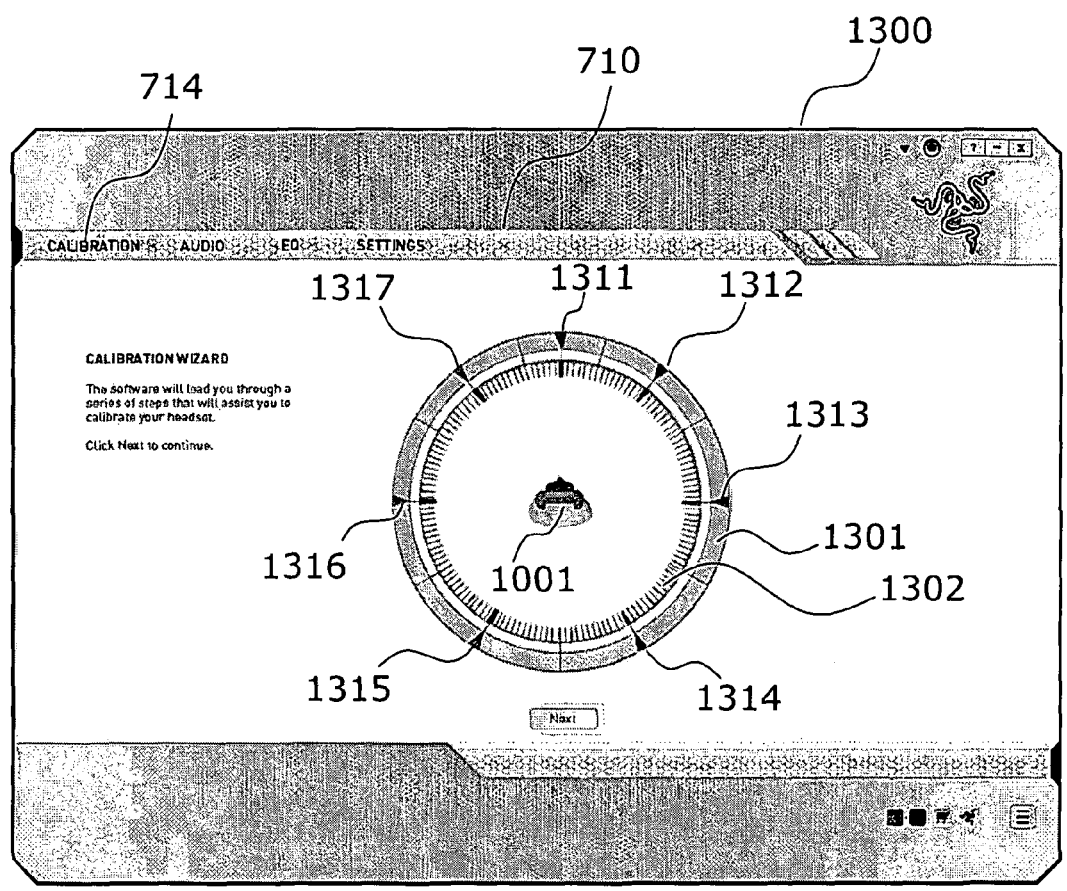
FIG. 13 shows a screen shot of a graphical user interface or application program window showing alternative representation of the speakers.
Figure 14:
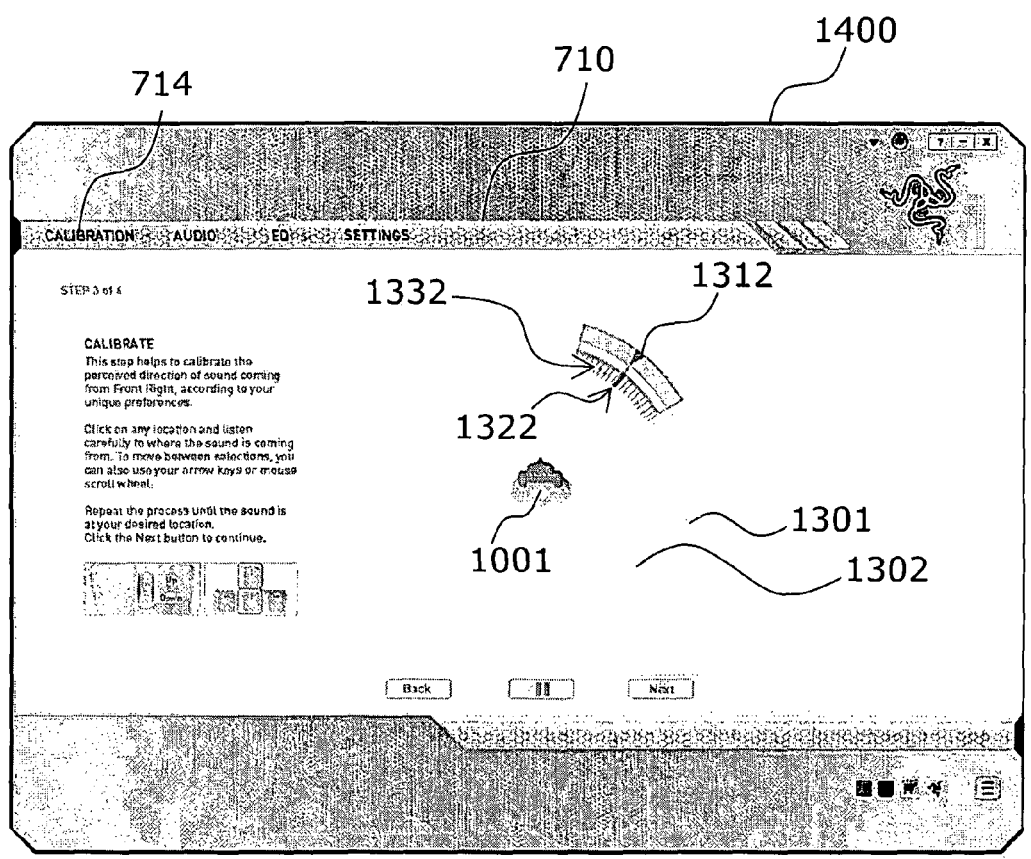
FIG. 14 shows an application window according to an embodiment.

FIG. 13 shows a screen shot 1300 of a graphical user interface or application program window showing alternative representation of the speakers. In FIG. 13, the speakers are represented by an "arrow-head" image instead of a loudspeaker image illustrated in FIG. 10. Similarly, the "arrow-head" speakers 1311-1317 are moveable on a circular path 1301. Furthermore, the application program window includes another circular path 1302 concentric to circular path 1301. The circular path 1302 includes a plurality of calibration markers positioned adjacent to the speakers 1311-1317 in their default position. When a speaker is selected (e.g. speaker 1312), the rest of the speaker fades away as shown in the application program window 1400 in FIG. 14. Similarly, the speaker 1312 includes a corresponding calibration marker 1322 that is moveable within a zone/region 1332 of the circular path 1302.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A method for outputting a modified audio signal, the method comprising:
   receiving from a user an input indicating an angle using a graphical user interface;
   determining a parameter for a head-related transfer function based on the received input indicating the angle;
   modifying an audio signal in accordance with the head-related transfer function based on the determined parameter; and
   outputting the modified audio signal;
   wherein the input indicating the angle is a graphical input indicating the angle by adjusting a position of a calibration marker of the graphical user interface;
   wherein the calibration marker of the graphical user interface is associated to an immovable virtual speaker location of the graphical user interface;
   wherein the calibration marker of the graphical user interface and the immovable virtual speaker location of the graphical user interface lie on a geometric shape;
   wherein the position of the calibration marker of the graphical user interface corresponds to a perceived audio origination point;
   wherein the immovable virtual speaker location of the graphical user interface represents a predetermined position of a surround sound system; and
   receiving from the user a further input indicating a head shape of the user;
   wherein the parameter for the head-related transfer function is determined further based on the received further input indicating the head shape of the user.

2. The method of claim 1, wherein the input indicating the angle is a graphical input indicating the angle by a direction from a center of a geometric shape.

3. The method of claim 1, further comprising:
   receiving from the user an input indicating an ear shape of the user.

4. The method of claim 3, wherein the parameter for the head-related transfer function is determined further based on the received input indicating the ear shape of the user.

5. The method of claim 1, wherein the receiving and the determining are performed for a plurality of immovable virtual speaker locations.

6. The method of claim 1, further comprising:
   sending the determined parameter to a server in a cloud.

7. The method of claim 1, further comprising:
   receiving a parameter for the head-related transfer function from a server in a cloud;
   modifying the audio signal in accordance with the head-related transfer function based on the received parameter; and
   outputting the modified audio signal.

8. A computing device comprising a processor configured to present a graphical user interface, the graphical user interface comprising:
   an application program window generated by an application program, wherein the application program window comprises:
   a visual representation of the user;
   an immovable visual representation of a speaker on a geometric shape around the user;
   a visual representation of a calibration marker on the geometric shape around the user;
   wherein the visual representation of the calibration marker is associated to the immovable visual representation of the speaker; and
   an input for inputting an indication of an angle by adjusting a position of the visual representation of the calibration marker with respect to the immovable visual representation of the speaker;
   wherein the position of the visual representation of the calibration marker corresponds to a perceived audio origination point;
   wherein the immovable visual representation of the speaker represents a predetermined position of a surround sound system;
   wherein the application program window is configured to receive from the user a further input indicating a head shape of the user;
   wherein the application program is configured to determine a parameter for a head-related transfer function based on the received further input indicating the head shape of the user.

9. The computing device of claim 8,
wherein the input comprises the visual representation of the calibration marker configured to be moved on the geometric shape.

10. The computing device of claim 8,
wherein the graphical user interface is configured to send the input indication of the angle to the application program.

11. The computing device of claim 8,
wherein the application program is configured to:
determine a parameter for a head-related transfer function based on the received input indicating the angle,
modify an audio signal in accordance with the head-related transfer function based on the determined parameter; and
output the modified audio signal.

12. The computing device of claim 8,
wherein the application program window further is configured to receive from the user an input indicating an ear shape of the user.

13. The computing device of claim 12,
wherein the application program is further configured to determine the parameter for the head-related transfer function further based on the received input indicating the ear shape of the user.

14. The computing device of claim 8,
wherein the application program window comprises immovable visual representations of a plurality of speakers and wherein the input is for inputting an angle for each of the immovable visual representation of each speaker.

15. The computing device of claim 8,
wherein the application program window further comprises a sender input for receiving an input for instructing the application program to send a parameter determined based on the input angle to a server in a cloud.

16. The computing device of claim 8,
wherein the application program window further comprises a receiver for receiving a parameter for a head-related transfer function from a server in a cloud;
wherein the application program is configured to modify the audio signal in accordance with the head-related transfer function based on the received parameter and to output the modified audio signal.

* * * * *